United States Patent [19]

Fawkes et al.

[11] 4,002,604
[45] Jan. 11, 1977

[54] AZO DYESTUFF INCLUDING A 1,3 OR 1,4-BENZODIOXAN RING STRUCTURE FUSED TO A THIAZOLE RING

[75] Inventors: David Melville Fawkes; John Lindley Leng, both of Manchester, England

[73] Assignee: Imperial Chemical Industries Limited, London, England

[22] Filed: Nov. 26, 1975

[21] Appl. No.: 635,423

[30] Foreign Application Priority Data

Dec. 18, 1974 United Kingdom ............ 54617/74

[52] U.S. Cl. ............................ 260/155; 260/305; 260/158
[51] Int. Cl.² ..................................... C09B 29/36
[58] Field of Search .................. 260/305, 158, 155

[56] References Cited

UNITED STATES PATENTS

| | | | |
|---|---|---|---|
| 2,876,231 | 3/1959 | Horwitz | 260/158 X |
| 3,515,713 | 6/1970 | Siegel et al. | 260/158 X |
| 3,705,145 | 12/1972 | Gottschlich et al. | 260/152 |
| 3,787,178 | 1/1974 | Renfrew | 260/158 X |

FOREIGN PATENTS OR APPLICATIONS 1,154,006  6/1969  United Kingdom ............ 260/205

*Primary Examiner*—Allen B. Curtis
*Attorney, Agent, or Firm*—Cushman, Darby & Cushman

[57] ABSTRACT

Azo dyestuffs devoid of carboxylic acid and sulphonic acid groups and of the formula I

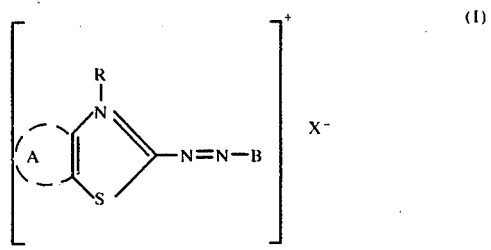

wherein A is the residue of 1,3 or 1,4-benzodioxan ring structure fused to the thiazole ring via the benzene ring, B is the residue of a para-coupling amine or an indole, R is an optionally substituted alkyl, alkenyl, cycloalkyl or aralkyl radical and X is an anion.

The dyestuffs are useful for the colorization of synthetic polymeric materials particularly polyacrylonitrile and copolymers thereof.

14 Claims, No Drawings

AZO DYESTUFF INCLUDING A 1,3 OR 1,4-BENZODIOXAN RING STRUCTURE FUSED TO A THIAZOLE RING

This invention relates to new water soluble azo dyestuffs, to their manufacture and to the use of such dyestuffs for the colouration of synthetic polymeric materials in the form of ribbons, tapes, fibres, films, threads and textile materials generally. The dyestuffs are particularly valuable for the colouration of polymers and copolymers of acrylonitrile and of dicyanoethylene and also acid modified polyesters and polyamides.

According to the present invention there are provided azo dyestuffs devoid of carboxylic acid and sulphonic acid groups and of the formula (I)

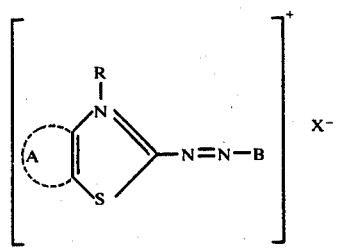

(I)

wherein A is the residue of a 1,3- or 1,4-benzodioxan ring structure fused to the thiazole ring via the benzene ring, B is the residue of a para-coupling amine or an indole, R is an optionally substituted alkyl, alkenyl, cycloalkyl or aralkyl radical and X is an anion.

Examples of residues formed by A and the thiazole ring include the following with the ring numbering added for convenience.

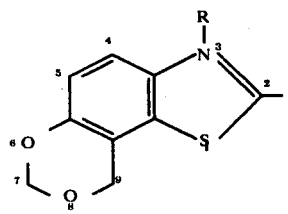

7H 9H [1,3] dioxino [4,5,g] benzthiazole

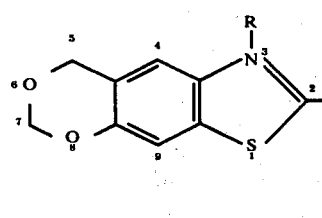

5H 7H [1,3] dioxino [5,4,f] benzthiazole

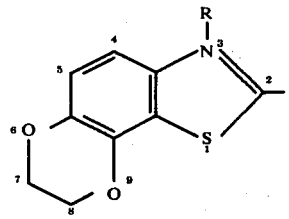

7H 8H [1,4] dioxino [2,3,g] benzthiazole

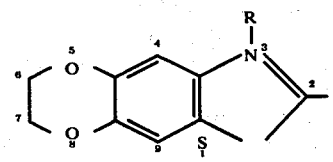

6H 7H [1,4] dioxino [2,3,f] benzthiazole

The benzdioxan ring represented by A in Formula I may be substituted by non-ionogenic substituents in the benz ring. Examples of such non-ionogenic substituents include halogens such as chlorine and bromine, alkyl such as methyl and ethyl, alkoxy such as methoxy and ethoxy, nitro, carboxylic acid ester such as ethoxy carbonyl, acyl such as methyl carbonyl, cyano, trifluoromethyl and acylamino such as acetylamino and propionylamino.

Preferably the residue of the benzdioxan ring structure represented by A contains no substituent in the benz ring.

Examples of R include lower alkyl such as methyl, ethyl, propyl and butyl, allyl, 2-hydroxyethyl, 1-chloro-2-hydroxypropyl, benzyl, 4'-methylbenzyl, 2-carbamoylethyl, 2-carbamoyl-2-methylethyl, 2-chloroethyl, 2-bromoethyl, 2-acetoxyethyl, cyclohexyl, phenylethyl, methoxyethyl and methoxycarbonylethyl.

Preferably R is methyl, ethyl or benzyl.

Where the term lower is used in this specification in connection with alkyl or alkoxy it means an alkyl or alkoxy group having from one to four carbon atoms.

B is the residue of a para-coupling amine or an indole.

One preferred type of para-coupling amine is that of the formula:

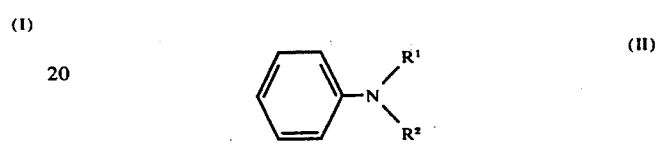

(II)

wherein $R^1$ and $R^2$ are independently hydrogen or an optionally substituted alkyl, aryl, aralkyl, alkenyl or cycloalkyl group or wherein $R^1$ and $R^2$ taken together form a heterocyclic ring with the nitrogen atom. Such coupling components may contain a fused benz ring and be, for example, of the type:

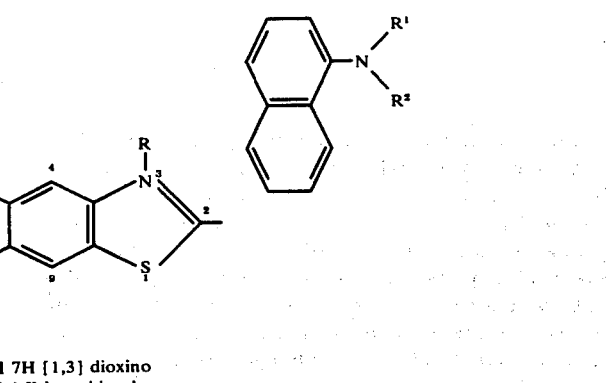

Examples of $R^1$ and $R^2$ include hydrogen, methyl, ethyl, propyl, butyl, phenyl, hydroxy lower alkyl such as 2-hydroxyethyl and 2 or 3-hydroxypropyl, lower alkoxy lower alkyl such as 2-(methoxy or ethoxy)ethyl and 3-methoxypropyl, cyano lower alkyl such as 2- cyanoethyl, aryl lower alkyl such as benzyl and β-phenylethyl, acyloxy lower alkyl such as 2-acetoxyethyl, lower alkoxycarbonyl, lower alkyl such as 2-methoxycarbonylethyl, hydroxy-, lower alkoxy-, lower alkyl such as 2-(2'-hydroxyethoxy)ethyl, lower alkoxy-, lower alkoxycarbonyl-, lower alkyl such as 2-(2'-methoxyethoxycarbonyl)ethyl, 2-carbamoylethyl, cycloalkyl such as cyclohexyl, hydroxyaryloxy-, lower alkyl such as hydroxyphenoxyethyl and cycloalkoxy-, lower alkyl such as cyclohexyloxyethyl.

Examples wherein $R^1$ and $R^2$ form a heterocyclic ring with the nitrogen atom include as the so-formed heterocyclic rings, morpholino, pyrrolidino and piperidino rings.

The benzene ring in coupling components of the type:

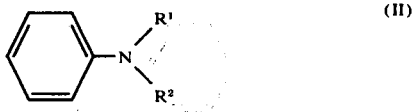

may be further substituted particularly in the 2 and 5 positions relative to the amino group, for example to give coupling components of the formula:

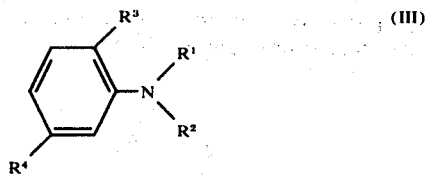

wherein $R^1$ and $R^2$ are as hereinbefore defined; $R^3$ is hydrogen, lower alkyl such as methyl, ethyl, propyl or butyl; lower alkoxy such as methoxy and ethoxy or halogen such as chlorine or bromine, and $R^4$ is hydrogen, lower alkyl such as methyl, ethyl, propyl or butyl, lower alkoxy such as methoxy, ethoxy, propoxy or butoxy, halogen such as chlorine or bromine, carbalkoxy such as methoxycarbonyl and ethoxycarbonyl; acyl such as methyl-, ethyl- and phenylcarbonyl, and methyl-, ethyl- and phenylsulphonyl; nitro, cyano, trifluoromethyl, thiocyano; acylamino such as formamide, acetylamino, propionylamino, phenyl-, ethyl- and methyl-sulphonylamino; sulphonamido, alkylsulphonamido such as methyl-, ethyl-, dimethyl and diethylsulphonamido, carbonamido and alkyl-carbonamido such as methyl-, ethyl-, diethyl- and dimethylcarbonamido, aryl acid amides such as phenylcarbamoyl and phenylsulphamoyl and ureido.

Preferred examples of $R^3$ include hydrogen, methyl, ethyl, methoxy, ethoxy and chloro. Preferred examples of $R^4$ include hydrogen, methyl, ethyl, methoxy, ethoxy, formamido, acetylamino, propionylamino, ureido, chloro and bromo.

An additional preferred class of para coupling amines from which B is derived are those of formula:

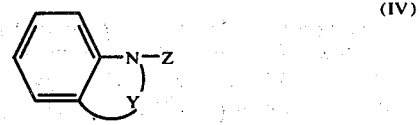

wherein Z is hydrogen or an optionally substituted alkyl, aralkyl, alkenyl or cycloalkyl group and Y is a divalent radical forming a 5- or 6-membered ring with the N atom and the two carbon atoms of the benzene ring. Examples of Z include those given hereinafter as examples of $R^{15}$.

Examples of such coupling components where Y is a divalent radical forming a 6-membered ring with the two carbon atoms of the benzene ring and nitrogen include tetrahydroquinolines of general formula:

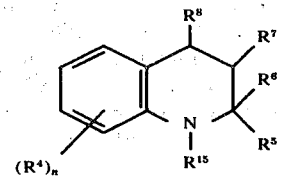

wherein $R^4$ is hydrogen, methyl, ethyl, methoxy, ethoxy, formamido, acetylamino, propionylamino, ureido, chloro or bromo, $R^5$, $R^6$, $R^7$ and $R^8$ are each independently hydrogen or lower alkyl, n is 0, 1, 2 or 3 and $R^{15}$ is hydrogen, or an optionally substituted alkyl, alkenyl, cycloalkyl, or aralkyl group. Preferably $R^5$, $R^6$, $R^7$ and $R^8$ are independently hydrogen, methyl or ethyl and n is preferably 0 or 1.

Important coupling components are those derived from 1,2,3,4-tetrahydroquinoline, 2-methyl, 1,2,3,4-tetrahydroquinoline, 4-methyltetrahydroquinoline, 2,4-dimethyltetrahydroquinoline, 2,2,4-trimethyltetrahydroquinoline, 2,4-diethyl 2-methyl tetrahydroquinoline, 2-ethyltetrahydroquinoline, 3-methyltetrahydroquinoline and 2,2-dimethyltetrahydroquinoline. $R^4$ is preferably methyl, ethyl, methoxy, ethoxy or chloro and n is 0 or 1. When n is 1, $R^4$ is preferably in the 7-position of the tetrahydroquinoline ring system.

Examples of $R^{15}$ include isopropyl, 2-methylpropyl, 3-methylpropyl, cyclohexyl, cyclopentyl, hydrogen, methyl, ethyl, propyl, butyl, allyl, benzyl, 2-chlorobenzyl, 4-chlorobenzyl, 4-methylbenzyl, 4-methoxybenzyl, 2-hydroxyethyl, 2-chloroethyl, 2-cyanoethyl, 2-bromoethyl, 2-methoxyethyl, 2-acetoxyethyl, 3-hydroxypropyl, 4-hydroxybutyl, 2-hydroxyisobutyl, 2-hydroxy-3-methoxypropyl, 2-hydroxy-3-ethoxypropyl, 2-hydroxy-3-propoxyethyl, 2-hydroxy-3-butoxypropyl, 2-hydroxy-3-allyloxypropyl, 2-hydroxy-3-phenoxypropyl, 2-hydroxy-2-phenylethyl, 2-n-amyloxyethyl, 2-n-butyloxyethyl, 2-t-butyloxyethyl, 2-cyclohexyloxyethyl, 2-benzoyloxyethyl, 2-methoxycarbonylethyl, 2-ethoxycarbonylethyl, 2-propoxycarbonylethyl, 2-butoxycarbonylethyl, 2-benzyloxycarbonylethyl, 2p-methoxybenzoyloxy)ethyl, 2-(p-methoxycarbonylbenzoyloxy)ethyl, 2-phenoxyethyl, 2-benzyloxyethyl, 2-(2'-phenylethyloxy)ethyl, 2-(3'-phenylpropoxy)ethyl, 2-(2'-phenyloxyethyloxy)ethyl, 2-(p-chlorophenoxy)ethyl, 2-(chlorobenzoyloxy)ethyl, 2-(o-chlorophenoxy)ethyl, 2-(p-methylphenoxy)ethyl, 2-(o-methylphenoxy)ethyl, 2-(p-ethylphenoxy)ethyl, 2-(o-ethylphenoxy)ethyl, 2-(m-methylphenoxy)ethyl, 2-(p-cyclohexylphenoxy)ethyl, 2-(2'-naphthoxy)ethyl, 2-(o-isopropyloxyphenoxy)ethyl, 2-(o,p-dichlorophenoxy)ethyl, 2-(p-phenylphenoxy)ethyl, 2-(o-benzylphenoxy)ethyl, 2-(p-benzylphenoxy)ethyl, 2-(p-tert-butylphenoxy)ethyl, 2-phenylthioethyl, 2-pentachlorophenylthioethyl, 2-(p-chloro-m-methylphenoxy)ethyl, 2-(p-methoxyphenoxy)ethyl, 2-(3,5-dimethylphenoxy)ethyl, 2-(3,5-dimethyl-4-chlorophenoxy)ethyl, 2-(o-isopropylphenoxy)ethyl, 2-[p-(2-phenylisopropyl)phenoxy]ethyl, 2-(1,2,3,4-tetrahydronaphth-6-oxy)ethyl, 2-(1,2,3,4-tetrahydronaphth-1-oxy)ethyl, 2-(phenylaminocarbonyloxy)ethyl, and the ethyl, methyl, propyl, butyl and benzyl, succinic, maleic and adipic acid half esters of the 2-hydroxyethyl group.

Examples of coupling components of general formula IV wherein Y is a divalent radical forming a 5-membered ring with nitrogen and two carbon atoms of the benzene ring are those of formula:

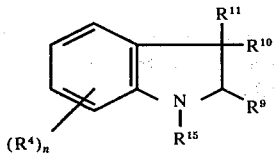

wherein $R^{15}$ and n are as hereinbefore defined, $R^4$ is hydrogen, methyl, ethyl, methoxy, ethoxy, formamido, acetylamino, propionylamino, ureido, chloro or bromo, $R^9$ is hydrogen, alkyl, cycloalkyl or aryl, $R^{10}$ is hydrogen or alkyl and $R^{11}$ is hydrogen or alkyl and also where $R^9$ with $R^{10}$ forms a saturated 6-membered ring with the two carbon atoms of the indoline ring. Examples of $R^9$ include methyl, ethyl, propyl, butyl, cyclohexyl, phenyl, and examples of $R^{10}$ and $R^{11}$ include methyl, ethyl, propyl and butyl.

Preferably $R^{10}$ and $R^{11}$ are independently hydrogen or methyl, and preferably $R^9$ is methyl or phenyl. Furthermore, a particularly important class is that where $R^4$ is methyl, ethyl, methoxy, ethoxy or chloro and n is 0 or 1. $R^{15}$ is as hereinbefore defined. $R^4$ is preferably in the 6-position of the indoline ring system.

Examples of indole coupling components from which B may be derived there are particularly mentioned those of formula:

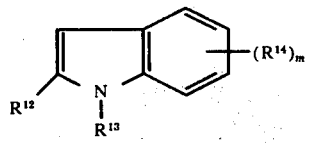

wherein $R^{12}$ is hydrogen, lower alkyl, aryl, aralkyl, halogen, acyl, acid amide, alkoxy-carbonyl and arylaminocarbonyl, $R^{13}$ is alkyl, aryl or aralkyl, $R^{14}$ is alkyl, alkoxy, halogeno, nitro, cyano or trifluoromethyl and m is 0, 1, 2, 3 or 4. Examples of $R^{12}$ include methyl, ethyl, phenyl, 4-methylphenyl, 4-methoxyphenyl, 4-chlorophenyl, benzyl, chloro, bromo, acetyl, propionyl, methoxycarbonyl, ethoxycarbonyl, carbamoyl and phenylaminocarbonyl. Examples of $R^{13}$ include methyl, ethyl, propyl, butyl, phenyl, 4-methylphenyl, benzyl and 2-cyanoethyl. Examples of $R^{14}$ include methyl, ethyl, methoxy, ethoxy, chloro, nitro, cyano and trifluoromethyl.

Preferably $R^{12}$ is methyl or phenyl, $R^{13}$ is methyl or ethyl, $R^{14}$ is methyl, ethyl, methoxy or chloro and m is 0 or 1.

Examples of the anion X include chloride, bromide, iodide, tetrachlorozincate, bisulphate, nitrate, sulphate, sulphamate, phosphate or borate, tetrafluoroborate or organic anions such as acetate, propionate, methosulphate, methylsulphate and p-tolylsulphonate. In those cases where the anion is polyvalent the dyestuffs will contain a corresponding molar proportion of the cationic part of the dyestuff.

As a preferred class of dyestuff there may be mentioned those of formula:

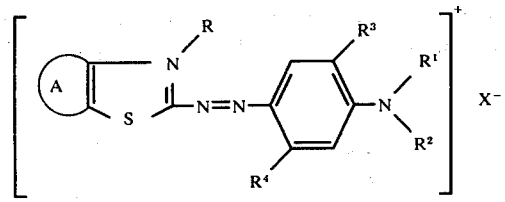

wherein A, R, $R^1$, $R^2$ and X are as hereinbefore defined, and where $R^3$ is hydrogen, chloro or methoxy and where $R^4$ is hydrogen, methyl, ethyl, methoxy or chloro. Particularly important are those dyestuffs wherein A represents a 1,3- or 1,4-benzdioxan ring system containing no substituent in the benz ring. Important dyestuffs are those wherein R is methyl or ethyl and particularly methyl.

A further additional preferred class of dyestuffs according to the present invention are those of formula:

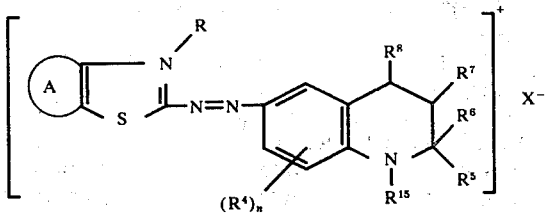

wherein A, R, $R^{15}$, $R^5$, $R^6$, $R^7$, $R^8$ and X are as hereinbefore defined and $R^4$ is methyl, ethyl, methoxy, ethoxy or chloro and n is 0 or 1. When n is 1, the substituent $R^4$ is preferably in the 7-position of the tetrahydroquinoline nucleus. Particularly important are those dyestuffs wherein A represents a 1,3- or 1,4-benzdioxino ring system containing no substituents in the benz ring. Important dyestuffs are those wherein R is methyl or ethyl, particularly methyl.

An additional preferred class of dyestuffs according to the present invention are those dyestuffs of formula:

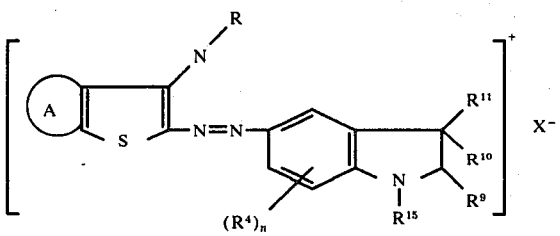

wherein A, R, $R^{15}$, $R^9$, $R^{10}$, $R^{11}$ and X are as hereinbefore defined, and where $R^4$ is methyl, ethyl, methoxy, ethoxy or chloro and n is 0 or 1. When n = 1, the substituent $R^4$ is preferably in the 6-position of the indoline ring system. Particularly important are those dyestuffs wherein A represents a 1,3- or 1,4-benzdioxan ring containing no substituent in the benz ring. Important dyestuffs are those wherein R is methyl or ethyl, particularly methyl.

As a further feature of the present invention there is provided a process for the manufacture of the dyestuff of the present invention which comprises alkylating a compound of the formula:

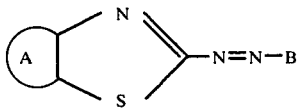

wherein A and B are as hereinbefore defined.

As examples of alkylating agents there may be mentioned alkyl halides such as methyl, ethyl, propyl and butyl chlorides and the corresponding bromides, alkenyl halides such as allyl chloride or bromide, aralkyl halides such as benzyl chloride or bromide, dialkyl sulphates such as dimethyl sulphate, diethyl sulphate, dipropyl sulphate and dibutyl sulphate, alkyl esters of aryl sulphonates such as methyl and ethyl p-toluene sulphonate and other lower alkyl esters of strong mineral acids or organic sulphonates. Other alkylating agents may themselves carry substituents for example chloropropionitrile, bromopropionamide and bromohydrin.

The reaction between the alkylating/quaternising agent and dyestuff of formula V may be carried out neat without addition of other solvents, or again may be carried out in an inert organic solvent such as benzene, toluene, xylene, chlorobenzene, nitrobenzene, acetone, carbontetrachloride, tetrachloroethane, perchloroethylene, chlorform, dimethylformamide, acetonitrile, acetic acid, formic acid or 2-ethoxyethanol. The alkylation may also be effected in aqueous phase optionally in the presence of an organic solvent. The alkylating agent may be used in considerable excess, for example up to 6 moles for each mole of dyestuff. Suitable temperatures are from 20° to 150° C and particularly 20°–90° C. The inclusion of an acid binding agent is often beneficial. Such agents include magnesium oxide, sodium and potassium carbonate, sodium and potassium bicarbonate, magnesium and calcium carbonate, potassium acetate or mixtures of such agents.

Alkylation of dyestuffs of formula V may also be carried out by reacting with for example acrylamide in an organic or mineral acid such as acetic, formic or hydrochloric acid or mixtures of these at between 50° and 100° C.

Alkylation may also be carried out by reacting a dyestuff of formula V with ethylene oxide or its derivatives of formula:

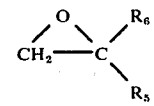

wherein $R_5$ and $R_6$ represent hydrogen or an optionally substituted lower alkyl group.

This reaction is carried out in a solvent in the presence of a mineral or organic acid which provides the anion X, at temperatures of 10° to 100° C and preferably 40°–90° C. Suitable acids include sulphuric, hydrochloric, hydrobromic, phosphoric, benzenesulphonic, toluenesulphonic, formic, acetic or propionic. Such acids may also serve as solvent or may be used in admixture with each other or with other organic solvent such as dimethylformamide, acetonitrile, dioxan, tetrahydrofuran, chlorobenzene, toluene, xylene, nitrobenzene, acetone or methylethylketone.

When the reaction is effected in hydrophobic organic solvents the alkylated dyestuff is normally insoluble and may be isolated by filtration. If desired, the alkylated dyestuff may be isolated from aqueous solution by precipitation in the form of a salt such as tetrachlorozincate obtained by adding zinc chloride to the aqueous solution.

As a result of the alkylation the dyestuff may be obtained for example in the form of the chloride, bromide or methosulphate according to the alkylating agent used. If the dyestuff is required as the salt of a different anion, then one anion may be replaced by another, by known methods of metathesis.

Insoluble azo dyestuffs which may be used as starting materials in the above alkylation process may be made by diazotising an amine of the formula:

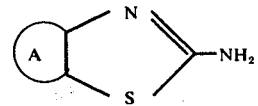

where A is as hereinbefore defined and coupling the resultant diazo compound with a coupling component which is a para-coupling amine or an indole.

Examples of diazo components include
2-amino 7H 9H [1,3]dioxino [4,5g] benzthiazole
2-amino 5H 7H [1,3]dioxino [5,4f] benzthiazole
2-amino 7H 8H [1,4]dioxino [2,3g] benzthiazole
2-amino 6H 7H [1,4]dioxino [2,3f] benzthiazole and analogues of the above compounds containing methyl, ethyl, methoxy, ethoxy, chloro or acetylamino substituents in the benz ring of the benzdioxan ring system. The preferred aminodioxinobenzthiazoles are those containing no substituent in the benz ring.

Examples of coupling components of general formula III include:
N,N-dimethylaniline
N,N-diethylaniline
N,N-diethyl-m-toluidine
N-ethyl-N-(2-hydroxyethyl)aniline
N-ethyl-N-(2-cyanoethyl)aniline
N-(2-cyanoethyl)-2-chloroaniline
N,N-bis(2-acetoxyethyl)-m-toluidine
N-ethyl-N-benzylaniline
N,N-dibenzylaniline
2:5-dimethoxyaniline
N-benzyl-N-(2-hydroxyethyl)aniline
N-ethyl-N-(2-methoxyethyl)aniline
N-methyl-N-(2-ethoxyethyl)-m-toluidine
N-cyclohexyl-m-toluidine
N-cyclohexyl-N-propyl-m-toluidine
N-cyclopentyl-N-ethyl-m-toluidine
N-ethyl-N-(2-methyl-n-propyl)-m-toluidine
N,N-di-n-propyl-m-toluidine
N-butyl-N-(3-methyl-n-propyl)-m-toluidine
N-butyl-N-(2,4-dimethyl-n-butyl)-m-toluidine
Diphenylamine
N-methyl-diphenylamine
N-methyl-N-allylaniline
N-ethyl-N-(2,-phenylethyl)aniline
N-ethyl-N-(2-chloroethyl)-m-anisidine
N-methyl-N-(2-bromoethyl)aniline
N-methyl-N-(2-hydroxypropyl)aniline
N-methyl-N-(3-hydroxypropyl)aniline
N-methyl-N-(2-hydroxybutyl)aniline
N-ethyl-N-(4-hydroxybutyl)aniline
N-ethyl-N-(2-hydroxyisobutyl)aniline 3N-ethyl-N-(2-hydroxy-3-methoxypropyl)aniline  N-ethyl-N-(2-hydroxy-3-ethoxypropyl)aniline
N-ethyl-N-(2-hydroxy-3-propoxypropyl)aniline
N-ethyl-N-(2-hydroxy-3-butoxypropyl)aniline
N-methyl-N-(2-hydroxy-3-allyloxypropyl)aniline
N-methyl-N-(2-hydroxy-3-phenoxypropyl)aniline
N-methyl-N-(2-hydroxy-2-phenylethyl)aniline
N-methyl-N-(2-n-amyloxyethyl)aniline
N-ethyl-N-(2-n-butyloxyethyl)aniline
N-ethyl-N-(2-t-butyloxyethyl)aniline
N-ethyl-N-(2-cyclohexyloxyethyl)aniline
N-ethyl-N-(2-methoxycarbonylethyl)aniline
N-ethyl-N-(2-ethoxycarbonylethyl)-m-toluidine
N-ethyl-N-(2-propoxycarbonylethyl)-m-chloroaniline
N-ethyl-N-(2-butoxycarbonylethyl)-m-anisidine
N-ethyl-N-(2-benzyloxycarbonylethyl)-m-anisidine
N-(2-hydroxyethoxyethyl-N-ethylaniline
N-(2-methoxyethoxycarbonylethyl)-N-ethyl-m-toluidine
N-phenylmorpholine
N-phenylpyrrolidine
N-phenylpiperidine
5-propionamido-N,N-diethylaniline
2-methoxy-5-acetylamino-N-[2-(2'-methoxyethoxycarbonyl)ethyl]aniline and the
methyl, ethyl, propyl, butyl, and benzyl, succinic, maleic and
adipic half esters of N-ethyl-N-(2-hydroxyethyl)aniline,
N,N-diethyl-1-naphthylamine N-methyl-N-(2-hydroxyethyl)-1-naphthylamine Examples of tetrahydroquinoline coupling components include (when THQ = tetrahydroquinoline):
THQ
N-methyl-THQ
N-ethyl-THQ
N-propyl-THQ
N-butyl-THQ
N-allyl-THQ
N-isopropyl-THQ
N-(2-methyl)propyl-THQ
N-(3-methyl)propyl-THQ
N-benzyl-THQ
N-(2-chlorobenzyl)-THQ
N-(4-chlorobenzyl)-THQ
N-(4-methylbenzyl)-THQ N-(4-methoxybenzyl)-THQ
N-(2-phenylethyl)-THQ
N-(2-hydroxyethyl)-THQ
N-(2-chloroethyl)-THQ
N-(2-bromoethyl)-THQ
N-(2-cyanoethyl)-THQ
N-(2-methoxyethyl)-THQ
N-(2-ethoxyethyl)-THQ
N-(2-acetoxyethyl)-THQ
N-(2-methylcarbonylethyl)-THQ
N-(2-hydroxypropyl)-THQ
N-(3-hydroxypropyl)-THQ
N-(2-hydroxy-3-chloropropyl)-THQ
N-(2-hydroxybutyl)-THQ
N-(4-hydroxybutyl)-THQ
N-(4-hydroxyisobutyl)-THQ
N-(2-hydroxy-3-methoxypropyl)-THQ
N-(2-hydroxy-3-ethoxypropyl)-THQ
N-(2-hydroxy-3-propoxypropyl)-THQ
N-(2-hydroxy-3-butoxypropyl)-THQ
N-(2-hydroxy-3-allyloxypropyl)-THQ
N-(2-hydroxy-3-phenoxypropyl)-THQ
N-(2-hydroxy-2-phenylethyl)-THQ
N-(2-n-amyloxyethyl)-THQ
N-(2-n-butyloxyethyl)THQ
N-(2-t-butyloxyethyl)
N-(2-cyclohexyloxyethyl)-THQ
N-(2-benzoyloxyethyl)-THQ
N-(2-methoxycarbonylethyl)-THQ
N-(2-ethoxycarbonylethyl)-THQ
N-(2-propoxycarbonylethyl)-THQ
N-(2-butoxycarbonylethyl)-THQ
N-(2-benzyloxycarbonlethyl)-THQ
N-isopropyl-THQ
N-(2-methyl-n-propyl)-THQ
N-2-(p-methoxybenzoyloxy)ethyl THQ
N-2-(p-methoxycarbonylbenzoyloxy)ethyl THQ
N-2-phenoxyethyl THQ
N-(2-benzyloxyethyl) THQ
N-2-(2'-phenylethyloxy)ethyl THQ
N-2-(3'phenylpropoxy)ethyl THQ
N-2(2'-phenyloxyethyloxy)ethyl THQ
N-2-(p-chlorophenoxy)ethyl THQ
N-2-(chlorobenzyloxy)ethyl THQ
N-2-(o-chlorophenoxy)ethyl THQ
N-2-(p-methylphenoxy)ethyl THQ
N-2-(o-methylphenoxy)ethyl THQ
N-2-(p-ethylphenoxy)ethyl THQ
N-2-(o-ethylphenoxy)ethyl THQ
N-2-(m-methylphenoxy)ethyl THQ
N-2-(p-cyclohexylphenoxy)ethyl THQ
N-2-(2'-naphthoxy)ethyl THQ
N-2-(o-isopropyloxyphenoxy)ethyl THQ N-2-(o,p-dichlorophenoxy)ethyl THQ
N-2-(p-phenylphenoxy)ethyl THQ
N-2-(o-benzylphenoxy)ethyl THQ
N-2-(p-benzylphenoxy)ethyl THQ
N- 2-(p-tert.butylphenoxy)ethyl THQ
N-(2-phenylthioethyl)THQ
N-(3-methyl-n-propyl)THQ
N-(2-pentachlorophenylthioethyl)-THQ
N-2-(p-chloro-m-methylphenoxy)ethyl-THQ
N-2-(p-methoxyphenoxy)ethyl-THQ
N2-(3,5-dimethylphenoxy)ethyl-THQ
N-2-(3,5-dimethyl-4-dimethyl-4-chlorophenoxy)ethyl-THQ
N-2-(o-isopropylphenoxy)ethyl-THQ
N-2-[p-(2-phenylisopropyl)phenoxy]ethyl-THQ
N-2-(1,2,3,4-tetrahydronaphth-6-oxy)ethyl-THQ
N-2-(1,2,3,4-tetrahydronaphth-1-oxy)ethyl-THQ Analogous coupling components are those derived from 2-methyltetrahydroquinoline, 4-methyltetrahydroquinoline, 2:4-dimethyltetrahydroquinoline, 2,2,4-trimethyltetrahydroquinoline, 2-ethyltetrahydroquinoline, 3-methyltetrahydroquinoline 2-methyl-2,4-diethyl tetrahydroquinoline and 2,2-dimethyltetrahydroquinoline. Furthermore, there may also be used as coupling components, analogues of the above-listed compounds in which methyl, ethyl, methoxy, ethoxy or chloro substituents are present in the non-heterocyclic ring of the tetrahydroquinoline, preferably in the 7- position of the tetrahydroquinoline nucleus.

Examples of indoline coupling components include the N-substituted analogues of 2-methylindoline, 2,3,3-trimethylindoline and 2-phenylindoline as in the above list of tetrahydroquinolines. There may also be used as coupling components, analogues of these indolines in which methyl, ethyl, methoxy, ethoxy or chloro substituents are present in the non-heterocyclic ring of the indoline, preferably in the 6- position of the indoline nucleus.

Examples of indole coupling components include N-methylindole, 2-methylindole, 2-phenylindole, N-methyl-2-methylindole, N-ethyl-2-phenylindole and 2,5-dimethylindole.

The aminodioxinobenzthiazoles used as diazo components may be prepared from known aminobenzdioxanes, for example by the following route:

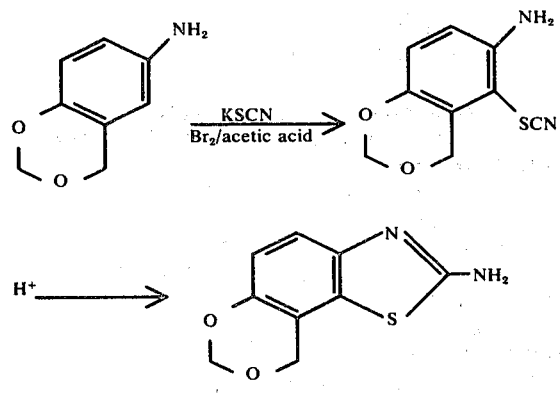

The preparation may give rise to isomeric mixtures which can be used to prepare mixed isomeric dyestuffs of the present invention. Alternative means of preparing the aminodioxinobenzthiazoles will be readily apparent to those skilled in the art.

The dyestuffs of the present invention may be used to colour polymeric materials by application from an aqueous bath. The present dyestuffs give valuable bright shades of high tinctorial strength.

In particular the dyestuffs of the invention are valuable for dyeing polyacrylonitrile materials and may be applied to polyacrylonitrile materials from acid, neutral or slightly alkaline dyebaths (i.e., pH from 3–8) at temperatures between 40°–120° C and preferably between 80°–120° C or by printing techniques using thickened print pastes. Dyeings of good fastness properties to washing and light are obtained.

The dyestuffs of the present invention may be used for the colouration of polymeric textile materials, particularly polymers and copolymers of acrylonitrile, by a wet transfer printing process. In this process a support, such as paper, is printed with an ink containing a dyestuff, the printed support is placed in contact with a textile material and the whole then subjected to heat pressure under humid or wet conditions and the dyestuff transferred to the textile material.

The invention is illustrated, but not limited, by the following Examples in which all parts and percentages are by weight unless otherwise stated.

PREPARATION OF INTERMEDIATE DIOXINO COMPOUND 2-amino 7H 9H [1,3] dioxino [4,5g] benzthiazole 45 parts of 6-amino 2H 4H [1,3] benzdioxan and 46.6 parts of potassium thiocyanate are stirred into 500 parts glacial acetic acid. The solution is cooled below 15° C and a solution of 5 parts bromine in 30 parts glacial acetic acid added with stirring over 1 hour maintaining the temperature below 15° C. After stirring overnight at ambient temperature, the yellow precipitate is filtered and then boiled in dilute hydrochloric acid, and screened hot. The filtrate is then cooled and basified with ammonia and the greyish aminodioxinobenzthiazole filtered, washed with water and dried (m.p. 226°–8° C).

The product may be redissolved in hot dilute hydrochloric acid with a little animal charcoal, screened, cooled and basified to yield a white solid.

| Analysis: | Theory | - | C 52 | H 3.8 | N 13.5 |
|---|---|---|---|---|---|
| | Actual | - | C 52 | H 3.8 | N 13.7 |

Infra red and nuclear magnetic resonance spectra are consistent with the formula:

red dyestuff is filtered, washed with water and dried. Yield of dyestuff = 3.8 parts.

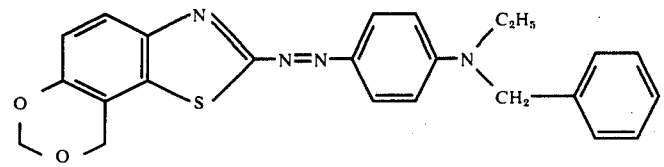

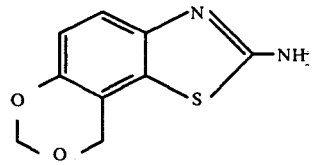

Repeated recrystallisation from aqueous ethanol yeilds colourless plates, m.p. 248°–9° C.

EXAMPLE 1

2.08 parts 2-amino 7H 9H [1,3] dioxino [4,5g] benzthiazole is dissolved in a mixture of 20 parts phosphoric acid and 4 parts propionic acid. The resultant dark brown solution is cooled below 5° C and 0.75 parts sodium nitrite added in portions over 1 hour with stirring maintaining the temperature below 5° C throughout. After stirring below 5° C for a further 60 minutes, excess nitrite is removed by addition of sulphamic acid solution.

2.1 parts N-benzyl-N-ethylaniline is dissolved in 100 parts water and 5 parts hydrochloric acid. The coupling bath is cooled below 10° C, and the above diazo solution added with stirring. After 30 minutes the resultant 2.9 parts of the above disperse dye is dissolved in 25 parts glacial acetic acid. 0.35 part magnesium oxide is added and the temperature raised to 70°–75° C. Dimethyl sulphate (2.5 parts) is then added with stirring and quaternisation effected over 4 hours at 70°–75° C. The reactants are then cooled, drowned into 150 parts water and heated to 75° C. 1 part 'Hyflo' supercel is added and the hot solution screened through a bed of 'Hyflo'. After cooling the cationic dyestuff is precipitated by addition of 3 parts by volume of 100% aqueous $ZnCl_1$ solution and 20 parts NaCl. 4.1 parts of a cationic dyestuff is filtered off and dried. It dyes polyacrylonitrile fibres greenish-blue shades from a weakly acid dyebath with excellent fastness properties.

If the dimethyl sulphate used in Example 1 is replaced by the equivalent amount of diethylsulphate, dibutyl sulphate, ethyl or methyl p-toluene sulphonate, similar dyestuffs are obtained.

If the 2-amino 7H 9H [1,3] dioxino [4,5g] benz thiazole used in Example 1 is replaced by the same amount of 2-amino 7H 8H [1,4] dioxino [2,3g] benzthiazole or 2-amino 6H 7H dioxino [2,3g] benzthiazole or mixtures thereof, greener shades result, and the resulting dyeings have excellent all-round fastness properties.

EXAMPLES 2 to 55

| Ex. | Coupling Component | Shade |
|---|---|---|
| 2 | N,N-dimethylaniline | Reddish-blue |
| 3 | N,N-diethylaniline | '' |
| 4 | N,N-diethyl m-toluidine | '' |
| 5 | N-ethyl N(2-hydroxyethyl)aniline | greenish-blue |
| 6 | N-ethyl N-(2-cyanoethyl)aniline | reddish-blue |
| 7 | N-(2-cyano ethyl) 2-chloro aniline | '' |
| 8 | N,N-bis(2-acetoxyethyl) m-toluidine | '' |
| 9 | 2,5-dimethoxy aniline | '' |
| 10 | N-benzyl N(2-hydroxyethyl)aniline | greenish-blue |
| 11 | N-ethyl N(2-methoxyethyl)aniline | reddish-blue |
| 12 | N-cyclohexyl m-toluidine | '' |
| 13 | N-cyclohexyl N-propyl m-toluidine | reddish-blue |
| 14 | N-cyclopentyl N-ethyl m-toluidine | '' |
| 15 | N-ethyl N(2-methyl n-propyl) m-toluidine | '' |
| 16 | N,N di(n-propyl) m-toluidine | '' |
| 17 | N-butyl N(3-methyl n-propyl) m-toluidine | '' |
| 18 | N-butyl N(2,4-dimethyl n-butyl)m-toluidine | '' |
| 19 | Diphenylamine | greenish-blue |
| 20 | N-methyl diphenylamine | '' |
| 21 | N-methyl N-allyl aniline | blue |
| 22 | N-ethyl N(2-phenyl ethyl)aniline | '' |
| 23 | N-ethyl N(2-chloro ethyl) m-toluidine | reddish-blue |
| 24 | N-methyl N-(2-bromo ethyl) aniline | blue |
| 25 | N-methyl N-(2-hydroxy propyl)aniline | greenish-blue |
| 26 | N-methyl N-(3-hydroxypropyl)aniline | blue |
| 27 | N-methyl N-(2-hydroxy butyl) aniline | greenish-blue |
| 28 | N-ethyl N-(4-hydroxy butyl)aniline | reddish-blue |
| 29 | N-ethyl N-(2-hydroxy isobutyl) aniline | greenish-blue |
| 30 | N-ethyl N-(2-hydroxy 3-methoxy propyl) aniline | '' |
| 31 | N-ethyl N-(2-hydroxy 3-ethoxy propyl)aniline | '' |
| 32 | N-ethyl N-(2-hydroxy 3-propoxy ethyl)aniline | '' |
| 33 | N-ethyl N-(2-hydroxy 3-butoxy propyl)aniline | '' |
| 34 | N-methyl N-(2-hydroxy 3-allyloxy propyl) aniline | '' |
| 35 | N-methyl N-(2-hydroxy 3-phenoxy propyl) aniline | '' |
| 36 | N-methyl N-(2-hydroxy 2-phenyl ethyl)aniline | '' |
| 37 | N-methyl N-(2-n-amyloxy ethyl)aniline | blue |
| 38 | N-ethyl N-(2-n-butyloxy ethyl)aniline | '' |

-continued

| Ex. | Coupling Component | Shade |
|-----|-------------------|-------|
| 39 | N-ethyl N-(2-t-butyloxy ethyl)aniline | " |
| 40 | N-ethyl N-(2-cyclohexyl oxy ethyl)aniline | " |
| 41 | N-ethyl N-(2-ethoxy carbonyl ethyl)m-toluidine | reddish-blue |
| 42 | N-ethyl N-(2-ethoxy carbonyl ethyl) m-toluidine | " |
| 43 | N-ethyl N-(2-propoxy carbonyl ethyl)m-chloro-aniline | " |
| 44 | N-ethyl N-(2-butoxy carbonylethyl)m-anisidine | " |
| 45 | N-ethyl N-(2-benzyloxycarbonyl ethyl)m-anisidine | " |
| 46 | N-(2-hydroxyethoxy ethyl) N-ethyl aniline | " |
| 47 | N-(2-methoxy ethoxy carbonyl ethyl) N-ethyl m-toluidine | " |
| 48 | N-phenyl morpholine | greenish-blue |
| 49 | N-phenyl pyrolidine | " |
| 50 | N-phenyl piperidine | " |
| 51 | 5-propionamido N,N-dimethyl aniline | reddish-blue |
| 52 | 2-methoxy 5-acetylamino N-[2-(2-methoxy-ethoxy carbonyl)ethyl] aniline | " |
| 53 | N-butyl N-(2-hydroxyethyl)aniline | greenish-blue |
| 54 | N,N-diethyl 1-naphthylamine | " |
| 55 | N-methyl N-(2-hydroxyethyl)-1-naphthylamine | " |

EXAMPLE 56

2.08 parts 2-amino 7H 9H dioxino [4,5,g]benzthiazole are diazotised as described in example 1.

1.61 parts N-ethyl tetrahydroquinoline is dissolved in 100 parts water and 100 parts acetone. After cooling below 0°C, the above diazo solution is added slowly with stirring, maintaining the temperature below 5°C throughout. After stirring for a further 30 mins, the acidity to Congo Red paper is neutralised by addition of sodium acetate, and the resultant bluish-red dyestuff filtered, washed with water and dried.

2.5 parts of the above dyebase is dissolved in 25 parts glacial acetic acid containing 0.35 parts magnesium oxide. 2.5 parts dimethylsulphate is added with stirring at 70°–75°C, and quaternisation continued at 85°–90°C until complete. After cooling, the reactants are drowned into 150 parts water, 1 pt 'hyflo' Suprasel is added, and the solution screened hot through 'hyflo'. Several to remove inorganic salts. After cooling, the cationic dyestuff is isolated in conventional manner at the tetrachlorozincate. It has the structure:

and dyes polyarylonitrile in bright blue shades from a weakly acid dyebath and which dyeings exhibit excellent all-round fastness properties.

If the dimethylsulphate used in the above example is replaced by an equivalent amount of diethylsulphate, dibutyl sulphate ethyl p-toluene sulphonate or methyl p-toluene sulphonate, similar dyestuffs are obtained.

If the 2-amino 7H 9H [1,3]dioxino [4,5 g] benzthiazole used is the above example is replaced by the same amount of 2-amino 7H 8H [1,4]dioxino [2,3 g] benzthiazole or 2-amino 6H 7H [1,4]dioxino [2,3 f] benzthiazole or mixtures thereof, greener shades result, and such dyeings have excellent all-round fastness properties.

EXAMPLES 57 to 163

If the N-ethyl THQ used in Example 56 is replaced by the equivalent amount of the following coupling components, similar dyestuffs are obtained whose shade on polyacrylonitrile is indicated in the third column of the table below:

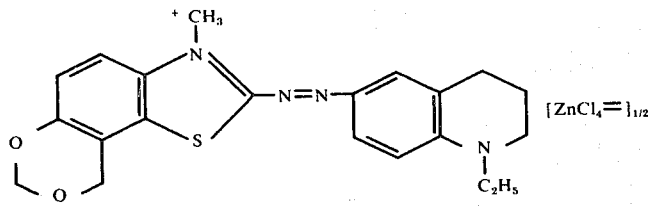

| Ex. | Coupling Component | Shade |
|-----|-------------------|-------|
| 57 | Tetrahydroquinoline (referred to below as THQ) | blue |
| 58 | N-methyl THQ | " |
| 59 | N-butyl THQ | " |
| 60 | N-allyl THQ | reddish-blue |
| 61 | N-(2-hydroxy ethyl) THQ | greenish-blue |
| 62 | N-benzyl THQ | blue |
| 63 | N-ethyl 2-methyl THQ | greenish-blue |
| 64 | N-butyl 2-methyl THQ | " |
| 65 | N-(2-hydroxyethyl) 2-methyl THQ | " |
| 66 | N-ethyl 7-methyl THQ | blue |
| 67 | N-propyl 2,7-dimethyl THQ | " |
| 68 | N-methyl 224 trimethyl THQ | greenish-blue |
| 69 | N-(2-hydroxyethyl) 224 trimethyl THQ | " |
| 70 | N-benzyl 224 trimethyl THQ | blue |
| 71 | N-butyl 2247 tetramethyl THQ | greenish-blue |
| 72 | N-ethyl 24 dimethyl THQ | " |
| 73 | N-(2-hydroxy ethyl) 24 dimethyl THQ | " |

-continued

| Ex. | Coupling Component | Shade |
|---|---|---|
| 74 | N-methyl 2-ethyl THQ | " |
| 75 | N-(2-hydroxy ethyl) 7-methyl THQ | " |
| 76 | N-ethyl 22 dimethyl THQ | " |
| 77 | N-(2-hydroxy ethyl) 3-methyl THQ | " |
| 78 | N-butyl 4-methyl THQ | blue |
| 79 | N-(2-hydroxyethyl) 4-methyl THQ | greenish-blue |
| 80 | N-benzyl 24 dimethyl THQ | blue |
| 81 | N-benzyl 2-ethyl THQ | " |
| 82 | N-benzyl 4-methyl THQ | " |
| 83 | N-butyl 7-methoxy THQ | reddish-blue |
| 84 | N-ethyl 7-chloro THQ | " |
| 85 | N-isopropyl THQ | blue |
| 86 | N-(2-methyl propyl THQ) | " |
| 87 | N-(2-chloro ethyl) THQ | " |
| 88 | N-(2-bromo ethyl) 2-methyl THQ | " |
| 89 | N-(2-cyano ethyl) THQ | reddish-blue |
| 90 | N-(2-methoxy ethyl) 4-methyl THQ | blue |
| 91 | N-(2-phenyl ethyl) THQ | " |
| 92 | N-(2'-chlorobenzyl) THQ | " |
| 93 | N-(4-chloro benzyl) THQ | " |
| 94 | N-(4-methyl benzyl) THQ | " |
| 95 | N-(4-methoxy benzyl) THQ | " |
| 96 | N-(2-ethoxy ethyl) THQ | " |
| 97 | N-(2-acetoxy ethyl) THQ | reddish-blue |
| 98 | N-(2-methyl carbonyl) THQ | " |
| 99 | N-(2-hydroxypropyl) THQ | greenish-blue |
| 100 | N-(2-hydroxy propyl) 2-methyl THQ | " |
| 101 | N-(2-hydroxy propyl) 224 trimethyl THQ | " |
| 102 | N-(3-hydroxy propyl) THQ | blue |
| 103 | N-(2-hydroxy 3-chloro propyl) THQ | greenish blue |
| 104 | N-(2-hydroxy butyl) THQ | " |
| 105 | N-(4-hydroxy butyl) THQ | blue |
| 106 | N-(4-hydroxy isobutyl) THQ | " |
| 107 | N-(2-hydroxy 3-methoxy propyl) THQ | greenish-blue |
| 108 | N-(2-hydroxy 3-ethoxy propyl) THQ | " |
| 109 | N-(2-hydroxy 3-propoxy propyl) THQ | " |
| 110 | N-(2-hydroxy 3-butoxy propyl) THQ | " |
| 111 | N-(2-hydroxy 3-allyloxy propyl) THQ | " |
| 112 | N-(2-hydroxy 3-phenoxy propyl) THQ | " |
| 113 | N-(2-hydroxy 2-phenylethyl) THQ | " |
| 114 | 2-methyl THQ | reddish-blue |
| 115 | 224 trimethyl THQ | blue |
| 116 | 2-ethyl THQ | reddish-blue |
| 117 | 22 dimethyl THQ | blue |
| 118 | 2,4-diethyl 2-methyl THQ | " |
| 119 | N-ethyl 2,4 diethyl 2-methyl THQ | greenish-blue |
| 120 | N-(2-hydroxy ethyl) 2,4 diethyl 2-methyl THQ | " |
| 121 | N-(2-n-amyloxy ethyl) THQ | blue |
| 122 | N-(2-n-butyloxy ethyl) THQ | " |
| 123 | N-(2-t-butyloxy ethyl) THQ | " |
| 124 | N-(2-cyclohexyloxy ethyl) THQ | " |
| 125 | N-(2-benzoyloxyethyl) THQ | " |
| 126 | N-(2-methoxy carbonyl ethyl) 2-methyl THQ | " |
| 127 | N-(2-ethoxy carbonyl ethyl) 224 trimethyl THQ | " |
| 128 | N-(2-propoxycarbonyl ethyl) 2,4 diethyl THQ | " |
| 129 | N-(2-butoxy carbonyl ethyl) THQ | " |
| 130 | N-(2-benzyloxy carbonyl ethyl) THQ | " |
| 131 | N-2(2-p-methoxybenzoyloxy)ethyl THQ | " |
| 132 | N-2-(p-methoxycarbonylbenzoyloxy)ethyl THQ | " |
| 133 | N-2-phenoxy ethyl THQ | " |
| 134 | N-(2-benzyloxyethyl)THQ | " |
| 135 | N-2(2-phenylethyloxy)ethyl THQ | " |
| 136 | N-2(3-phenyl propoxy)ethyl THQ | " |
| 137 | N-2-(2-phenyloxy ethyloxy)ethyl THQ | " |
| 138 | N-2-(p-chloro phenoxy)ethyl THQ | " |
| 139 | N-2-(p-chloro benzoyloxy)ethyl THQ | " |
| 140 | N-2-(o-chloro phenoxy) ethyl THQ | " |
| 141 | N-2-(p-methyl phenoxy)ethyl THQ | " |
| 142 | N-2-(o-methyl phenoxy) ethyl THQ | " |
| 143 | N-2-(p-ethyl phenoxy) ethyl THQ | " |
| 144 | N-2-(o-ethyl phenoxy) ethyl THQ | " |
| 145 | N-2-(m-methyl phenoxy) ethyl THQ | " |
| 146 | N-2-(p-cyclohexyl phenoxy) ethyl THQ | " |
| 147 | N-2-(2-naphthoxy)ethyl THQ | " |
| 148 | N-2-(o-isopropyloxy phenoxy) ethyl THQ | " |
| 149 | N-2-(o-p-dichlorophenoxy)ethyl THQ | " |
| 150 | N-2-(p-phenylphenoxy)ethyl THQ | " |
| 151 | N-2-(o-benzyl phenoxy) ethyl THQ | " |
| 152 | N-2-(p-benzylphenoxy)ethyl THQ | " |
| 153 | N-2-(p-tert butyl phenoxy) ethyl THQ | " |
| 154 | N-(2-phenylthio)ethyl THQ | " |
| 155 | N-(2-pentachloro phenyl thio ethyl) THQ | " |
| 156 | N-(p-chloro m-methyl phenoxy) ethyl THQ | " |
| 157 | N-2(p-methoxy phenoxy)ethyl THQ | " |
| 158 | N-2-(3,5-dimethyl phenoxy)ethyl THQ | " |
| 159 | N-2-(3,5-dimethyl 4-chloro phenoxy)ethyl THQ | " |
| 160 | N-2-(o-isopropyl phenoxy) ethyl THQ | " |
| 161 | N-2-[p-(2-phenyl isopropyl)phenoxy] ethyl THQ | " |
| 162 | N-2-(1274 tetrahydronaphth 6-oxy)ethyl THQ | " |

| Ex. | Coupling Component | Shade |
|---|---|---|
| 163 | N-2-(1234 tetrahydronaphth-1-oxy)ethyl THQ | " |

EXAMPLE 164

If the N-ethyl THQ used in Example 1 is replaced by 1.61 parts N-ethyl 2-methyl indole, and the resultant dyebase is quaternised in an identical manner to that described, a blue cationic dyestuff is obtained of structure.

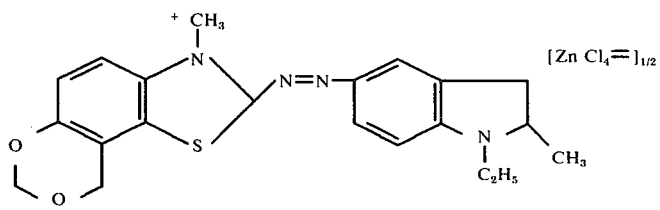

If dyed polyacrylonitrile fibres in bright blue shades from a weakly acid dyebath, and which dyeings exhibit excellent fastness properties.

2.42 parts of the above dyebase is dissolved in 25 parts glacial acetic acid, 0.35 parts magnesium oxide is added and the temperature raised to 70°–75°C. 2.5 parts dimethyl sulphate is added dropwise with stirring at 70°–75°C, and quaternisation continued at this temperature until complete. The reactants are then cooled, drowned into 200 parts water and 1 part 'hyflo' Supercel added. The cationic dyestuff solution is then screened through 'hyflo' Supercel to remove inorganic salts, and the cationic dyestuff isolated in conventional manner as to tetrachlorozincate. It has the structure.

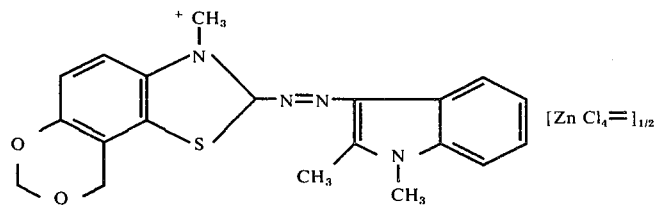

EXAMPLES 165 to 170

Similar dyestuffs may be obtained by replacing the N-ethyl 2-methyl indole used in the above example by the equivalent amount of the following coupling components. Their shade on polyacrylonitrile is indicated in the third column of the table below.

|   | Coupling Component | Shade |
|---|---|---|
| 165 | N-(2-hydroxy ethyl) 2-methyl indoline | greenish-blue |
| 166 | N-methyl 2-phenyl indoline | blue |
| 167 | N-(2-hydroxy ethyl) 2-phenyl indoline | greenish-blue |
| 168 | N-butyl 233 trimethyl indoline | blue |
| 169 | N-(2-hydroxy ethyl) 233 trimethyl indoline | greenish-blue |
| 170 | N-(2-hydroxy ethyl) 2,6 dimethyl indoline | " |

EXAMPLE 171

2.08 parts 2-amino 7H 9H [1,3]dioxino [4,5,g] benzthiazole is diazotised as described in Example 1.

1.45 parts N-methyl 2-methyl indole is dissolved in 100 parts water containing 5 parts conc hydrochloric acid. After cooling below 0°C, the above diazo solution is added slowly with stirring, maintaining the temperature below 5°C throughout. The coupling bath is then stirred at 0°–5°C for a further 30 minutes prior to neutralising to Congo Red test paper by the addition of sodium acetate. The resulting yellow dyestuff is filtered, washed with water and dried.

and dyes polyacrylonitrile in red shades from a weakly acid dyebath.

EXAMPLE 172

2.9 parts of the dyebase where preparation is described in Example 1 is dissolved in 30 parts dimethyl formamide, and 1.7 parts dimethyl sulphate are added dropwise with stirring at 85°–90°C. Quaternisation is continued at 85°–90°C until complete when the liquors are drowned into 200 parts water. The dyestuff is isolated as the tetrachlorozincate in conventional manner and has identical properties to the dyestuff described in Example 1.

If the dimethylsulphate is replaced by equivalent amounts of diethylsulphate, dipropylsulphate, dibutylsulphate, ethyl p-toluene sulphonate, or methyl p-toluene sulphonate, similar dyestuffs are obtained.

EXAMPLE 173

3.68 parts of the dyebase derived from 2-amino 7H 9H [1,3]dioxino [4,5]benzthiazole and diethylaniline is stirred under reflux with 2.5 parts dimethylsulphate in 50 parts chloroform. When quaternisation is complete, the chloroform is removed by distillation, and to cationic dyestuff which is obtained as the methosulphate is dissolved in 200 parts water. The cationic dyestuff is obtained as the tetrachlorozincate in conventional manner and has the structure.

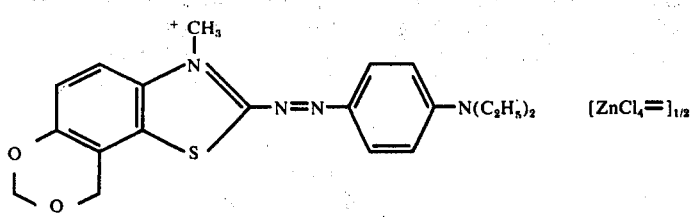

It dyes polyacrylonitrile in bright blue shades from a weakly acid dyebath, and which dyeings exhibit excellent all-round fastness properties.

If the dimethyl sulphate used in the above example is replaced by the equivalent amount of diethylsulphate, dibutyl sulphate, ehtyl p-toluene sulphonate, methyl p-toluene sulphonate or benzyl chloride, allyl bromide, chloroprompnitrile, bromopropionamide or bromohydrin, similar dyestuffs are obtained.

If the chloroform used in the above example is replaced by an equivalent volume of benzene, toluene, xylene, nitrobenzene, acetone, carbon tetrachloride, tetrachloro ethane, perchloroethylene, acetonitrile or 2-ethoxyethanol, similar dyestuffs are obtained.

EXAMPLE 174

3.8 parts of the dyebase obtained from 2-amino 7H 9H [1,3]dioxino [4,5 g] benzthiazole and N-ethyl THQ is dissolved in 20 parts glacial acetic acid and 1.0 parts conc hydrochlorid acid. 7.2 parts acrylamide are added dropwise with stirring at 60°–65°C, and the reaction continued at 85°–90°C until quaternisation is complete. The reactants are then drowned into 200 parts water. Isolated as before. It has the structure:

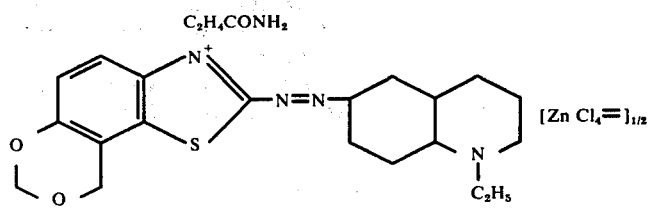

and dyes polyacrylonitrile in bright blue shades from a weakly acid dyebath.

EXAMPLE 175

3.8 parts of the dyebase used in the above example are dissolved in 20 parts ethanol, and heated under pleasure with 3.0 parts ethyl bromide for 4 hours at 100°–110° C. After removal of the solvents by distillation, the active dyestuff is obtained as the bromide of structure:

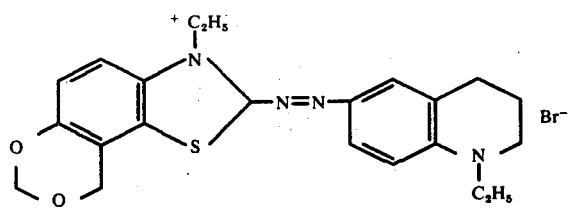

It may be dissolved in water, and isolated as the tetrachlorozincate in conventional manner. It dyes polyacrylonitrile in bright blue shades from a weakly acid dyebath and which dyeings exhibit good all-round fastness properties.

Similar dyestuffs are obtained by replacing the ethyl bromide used in the above example by equivalent amounts of methyl bromide, propyl bromide, butyl bromide, allylbromide, benzyl bromide or their equivalent chlorides.

EXAMPLE 176

16 gm of the dyebase of structure

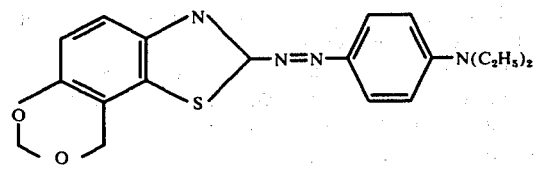

is dissolved in 50 parts glacial acetic acid. Ethylene oxide is passed through the solution with stirring at 80°–85°C until quaternisation is complete. The liquors are then drowned into 150 parts water, and the cationic dyestuff isolated in conventional manner as the tetrachlorozincate. It dyes polyacrylonitrile in bright blue shades from a weakly acid dyebath.

EXAMPLE 177

Polyacrylonitrile textile material is entered in a dyebath liquor comprising 0.15 gm/l of the dye described in Example 1, 0.75 gm/l 30% aqueous acetic acid and 0.38 g/l sodium acetate, and dyed at a liquor to goods ratio of 40:1 by slowly raising to the boil over 30 minutes and completing the dyebath exhaustion by boiling for a further 45 minutes. The dyed material is then rinsed in warm water and dried to give a bright greenish-blue shade exhibiting excellent fastness properites.

EXAMPLE 178

A print paste is prepared from 30 parts dyestuff described in Example 1, 50 parts ehtylene thio diglycol, 30 parts cyclohexanol and 30 parts 30% aqueous acetic acid. After diluting with 300 parts warm water, the solution is added to 500 parts gum arabic as thickener. Finally 30 parts zinc nitrate are added to the print paste.

Polyacrylonitrile textile material is printed with the above print paste and steamed for 20 minutes at 100°–105°C. After washing with warm water and drying a bright greenish-blue print is obtained which exhibits excellent fastness properties.

EXAMPLE 179

Acid-modified polyethylene terephthalate textile material is entered in an aqueous dyebath at 20°C comprising 10 parts/1 sodium sulphate, 1 part/1 polyglycol ether of phenyl alcohol (50 mols ethylene oxide/mole oleyl alcohol), 10 parts/1 dimethyl benzyl dodecyl ammonium chloride and 0.15 parts/1 of the dyestuff described in Example 1. After adjusting the pH to 4–5 with acetic acid, the textile material is dyed at a liquor to goods ratio of 40:1 by slowly raising to the boil over 30 minutes, and maintaining at this temperature for 60 minutes. After rinsing and dyeing a bright greenish blue shade is obtained.

EXAMPLE 180

Acid modified polyamide textile material is entered at 40°C in an aqueous dyebath containing 10 pt/1 sodium acetate, 2 pt/1 polyglycol ether of oleyl alcohol (50 moles ethylene oxide/mole oleyl alcohol) and 0.3 parts dyestuff described in example 16. After adjusting the pH to 4.5 with acetic acid, the textile material is dyed at a liquor to goods ratio of 40:1 by slowly raising to the boil over 30 minutes and maintaining the temperature for a further 60 minutes. After rinsing and drying, a bright greenish-blue dyeing is obtained.

We claim:

1. An azo dyestuff devoid of carboxylic acid and sulphonic acid groups and of the formula I

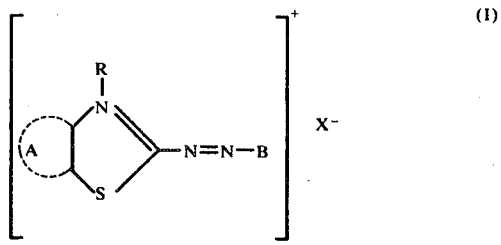

(I)

wherein A is a 1,3 or 1,4-benzodioxan ring structure fused to the thiazole ring via the benzene ring, B is the radical of a para-coupling amine or an indole, R is an optionally substituted alkyl, alkenyl, cycloalkyl or aralkyl radical and X is an anion.

2. An azo dyestuff as claimed in claim 1 wherein the benzodioxan ring structure represented by A contains no substituent in the benz ring thereof.

3. An azo dyestuff as claimed in claim 2 wherein R is methyl; ethyl or benzyl.

4. An azo dyestuff as claimed in claim 1 wherein B is the radical of a para-coupling amine of the formula:

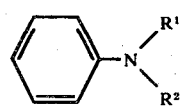

wherein $R^1$ and $R^2$ are independently hydrogen or an optionally substituted alkyl, aryl, aralkyl, alkenyl or cycloalkyl group or $R^1$ and $R^2$ taken together form a heterocyclic ring with the nitrogen atom.

5. An azo dyestuff as claimed in claim 4 wherein B is the radical a coupling component of the formula:

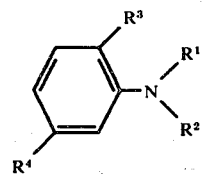

wherein $R^1$ and $R^2$ are as defined in Claim 4, $R^3$ is hydrogen, methyl, ethyl, methoxy, ethoxy or chloro and $R^4$ is hydrogen, methyl, ethyl, methoxy, ethoxy, formamido, acetylamino, propionylamino, ureido, chloro or bromo, 6. An azo dyestuff as claimed in claim 5 of the formula:

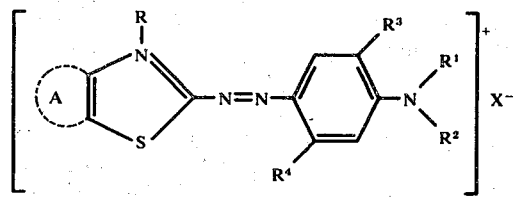

wherein A and X are as defined in claim 1, $R^1$ and $R^1$ are independently hydrogen or an optionally substituted alkyl, aryl, aralkyl, alkenyl or cycloalkyl group or $R^1$ and $R^2$ taken together form a heterocyclic ring with the nitrogen atom, $R^3$ is hydrogen, chloro or methoxy and $R^4$ is hydrogen, methyl, ethyl, methoxy or chloro and R is methyl, ethyl or benzyl.

7. An azo dyestuff as claimed in claim 1 wherein B is the radical of a para coupling amine of formula:

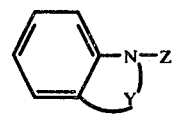

wherein Z is hydrogen or an optionally substituted alkyl, aralkyl, alkenyl or cycloalkyl group and Y is a divalent radical forming a five or six membered ring with the nitrogen atom and the two carbon atoms of the benzene ring.

8. An azo dyestuff as claimed in claim 7 wherein B is the radical of a coupling component which is a tetrahydroquinoline of the formula:-

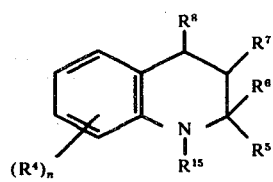

wherein $R^4$ is hydrogen, methyl, ethyl, methoxy, ethoxy, formamido acetylamino, propionylamino, ureido, chloro or bromo, n is 0, 1, 2 or 3, $R^5$, $R^6$, $R^7$ and $R^8$ are each independently hydrogen or lower alkyl and $R^{15}$ is hydrogen or an optionally substituted alkyl, alkenyl, cycloalkyl, or aralkyl group.

9. An azo dyestuff as claimed in claim 8 wherein $R^5$, $R^6$, $R^7$ and $R^8$ are each independently hydrogen, methyl or ethyl and n is 0 or 1.

10. An azo dyestuff as claimed in claim 8 of the formula:

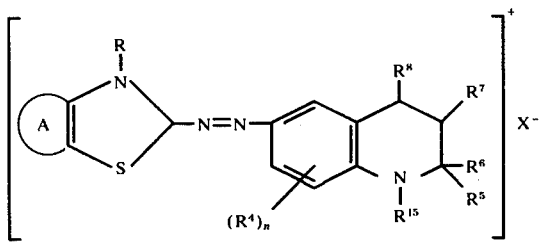

wherein A, R and X are as defined in claim 1, $R^4$ is methyl, ethyl, methoxy, ethoxy or chloro and n is 0 or 1 and where n is 1 the substituent $R^4$ in the 7-position of the tetrahydroquinoline nucleus.

11. An azo dyestuff as claimed in claim 1 wherein B is the radical of a coupling component of the formula:

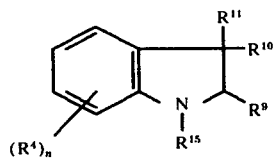

wherein $R^{15}$ is hydrogen or an optionally substituted alkyl, alkenyl, cycloalkyl, or Aralkyl group and n is 0, 1, 2, or 3, $R^4$ is hydrogen, methyl, ethyl, methoxy or ethoxy, formamido, acetylamino, propionylamino, ureido, chloro or bromo, $R^9$ is hydrogen, alkyl, cycloalkyl or aryl, $R^{10}$ is hydrogen or alkyl, $R^{11}$ is hydrogen or alkyl or $R^9$ and $R^{10}$ form a saturated 6-membered ring with the two carbon atoms of the indoline ring.

12. An azo dyestuff as claimed in claim 11 of the formula

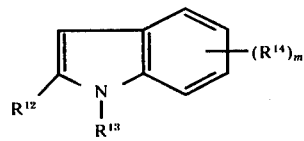

wherein A, R and X are as defined in claim 1, $R^9$, $R^{10}$, $R^{11}$ and $R^{15}$ are as defined in claim 11, is methyl, ethyl, methoxy, ethoxy, or chloro and n is 0 or 1 and when n is 1 the substituent $R^4$ is in the 6-position of the indoline ring.

13. An azo dyestuff as claimed in claim 1 wherein B is the radical of an indole coupling component of formula:

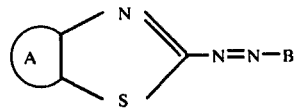

wherein $R^{12}$ is methyl or phenyl, $R^{13}$ is methyl or ethyl, $R^{14}$ is methyl, ethyl, methoxy or chloro and m is 0 or 1.

14. A process for the manufacture of azo dyestuffs as claimed in claim 1 which comprises alkylating a compound of the formula:

wherein A and B are as defined in claim 1.

* * * * *